United States Patent
Perreault et al.

(10) Patent No.: US 10,241,329 B2
(45) Date of Patent: Mar. 26, 2019

(54) VARIFOCAL ABERRATION COMPENSATION FOR NEAR-EYE DISPLAYS

(71) Applicant: Google Inc., Mountain View, CA (US)

(72) Inventors: John D. Perreault, Mountain View, CA (US); Patrick Llull, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/648,731

(22) Filed: Jul. 13, 2017

(65) Prior Publication Data
US 2019/0018236 A1 Jan. 17, 2019

(51) Int. Cl.
*G02B 27/00* (2006.01)
*G02B 27/01* (2006.01)
*G06F 3/01* (2006.01)

(52) U.S. Cl.
CPC ..... *G02B 27/0093* (2013.01); *G02B 27/0172* (2013.01); *G06F 3/013* (2013.01); *G02B 2027/014* (2013.01); *G02B 2027/0118* (2013.01); *G02B 2027/0178* (2013.01)

(58) Field of Classification Search
CPC ....... A61B 3/113; A61B 3/0025; A61B 3/112; G06K 9/00604; G06F 3/013
USPC ........................................................ 351/209
See application file for complete search history.

(56) References Cited

U.S. PATENT DOCUMENTS

| | | | | |
|---|---|---|---|---|
| 5,596,339 | A | * | 1/1997 | Furness, III ........... G02B 26/10 345/8 |
| 6,008,781 | A | * | 12/1999 | Furness, III ......... G02B 27/017 345/8 |
| 9,116,337 | B1 | | 8/2015 | Miao |
| 9,529,198 | B2 | | 12/2016 | Fitch et al. |
| 2015/0312558 | A1 | * | 10/2015 | Miller ................ H04N 13/0484 348/54 |
| 2016/0327793 | A1 | | 11/2016 | Chen et al. |
| 2017/0160789 | A1 | | 6/2017 | Lanman et al. |
| 2017/0160798 | A1 | | 6/2017 | Lanman et al. |
| 2017/0336638 | A1 | | 11/2017 | Bos et al. |
| 2018/0120573 | A1 | | 5/2018 | Ninan et al. |

FOREIGN PATENT DOCUMENTS

WO 2016105282 12/2014

OTHER PUBLICATIONS

Konrad, R. & Kong, T., "Depth Cues in VR Head Mounted Displays with Focus Tunable Lenses", Stanford University, 2015, 6 pages.
(Continued)

*Primary Examiner* — Mohammed A Hasan (57) ABSTRACT

A method of operation in a near-eye display system includes determining, using an eye tracking component of the near-eye display system, a pose of a user's eye. A shift vector is determined for a magnifier lens of the near-eye display system based on the pose of the user's eye, and the shift vector is communicated to an actuator of the near-eye display system to instruct translation of the magnifier lens relative to the user's eye. After translation of the magnifier lens, an array of elemental images is rendered at a position within a near-eye lightfield frame and communicated for display at a display panel of the near-eye display system.

18 Claims, 5 Drawing Sheets

(56) References Cited

OTHER PUBLICATIONS

Invitation to Pay Additional Fees and Partial International Search dated Aug. 9, 2018 for corresponding PCT/US2018/032558, 12 pages.
International Search Report and Written Opinion dated Oct. 2, 2018 for corresponding PCT/US2018/032558, 18 pages.

* cited by examiner

VARIFOCAL ABERRATION COMPENSATION FOR NEAR-EYE DISPLAYS

BACKGROUND

Head-mounted displays (HMDs) and other near-eye display systems can utilize a near-eye lightfield display or other computational display to provide display of three-dimensional (3D) graphics. Generally, the near-eye lightfield display employs one or more display panels and a number of lenses, pinholes, or other optical elements that overlie the one or more display panels. A rendering system renders an array of elemental images, with each elemental image representing an image or view of an object or scene from a corresponding perspective or virtual camera position. Such near-eye lightfield displays typically exhibit a disparity between vergence (i.e., simultaneous movement of the eyes in opposite directions to maintain binocular fixation of eye gaze on objects at different distances) due to the physical surface of the display panel and accommodation (i.e., changing the focal power of the lenses in the eyes) due to the focal point in simulated graphics of the HMDs.

In natural viewing (as opposed to viewing a virtual scene), vergence and accommodation requirements are consistent with one another: looking at a nearer object requires convergence and an increase in lens focal power, while looking at a farther object requires divergence and a decrease in focal power. Accordingly, and because the distances to which the eyes converge and accommodate are generally the same, the two responses are coupled such that changes in vergence produce changes in accommodation, and vice versa. However, conventional near-eye display systems often encounter vergence-accommodation conflicts when distance from the display panel (which is generally fixed) differs from the virtual depth of objects presented on the display panel (which generally varies with the content), resulting in discomfort and fatigue for the viewer.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate example methods and systems for dynamic varifocal aberration compensation based on user eye pose in a near-eye display system. In at least one embodiment, the near-eye display system employs a computational display to display near-eye lightfield frames of imagery to a user so as to provide the user with an immersive virtual reality (VR) or augmented reality (AR) experience. Each near-eye lightfield frame is composed of an array of elemental images, with each elemental image representing a view of an object or scene from a different corresponding viewpoint.

To provide improved depth cues without a corresponding reduction in FOV and/or perceived frame-rate, in at least one embodiment the near-eye display systems described herein utilize a dynamic magnifier lens shifting technique wherein an eye tracking component is utilized to determine the pose (position and/or rotation) of the user's eye and, based on this pose, shift a magnifier lens relative to the display screen of the near-eye display system so as to change the eye's perception of the depth cues. As an example, conventional near-eye display systems sometimes encounter a vergence-accommodation conflict due to a mismatch between the vergence distance to focus on a virtual object and the accommodation distance due to, for example, the near-eye proximity of the display screen. The near-eye display system compensates for this vergence-accommodation conflict by shifting the magnifier lens relative to the user's eye to cause a corresponding shift in the accommodation plane in VR. By matching the shifted accommodation plane to the vergence plane, the near-eye display system is able to simulate real-life viewing responses for both vergence and accommodation.

As another example, conventional near-eye display systems sometimes encounter gaze-dependent aberrations. The near-eye display system shifts the magnifier lens relative to the user's eye to correct for aberrations caused by, for example, visual distortions due to gazing at different portions of the display screen, irreproducibility in placing a VR/AR HMD at the same position on the user's face over repeated usages, differences in eye geometry (e.g., inter-pupillary distance) amongst different users, etc. Thus, dynamically shifting the magnifier lens and rendering the image array responsive to shifts in the pose of the eye in the user effectively compensates for verge-accommodation conflict and gaze-dependent aberration without sacrificing the focusing power of any utilized optical components, which may otherwise lead to a corresponding reduction in the FOV and/or display frame-rate of the near-eye display system.

Figure 1:
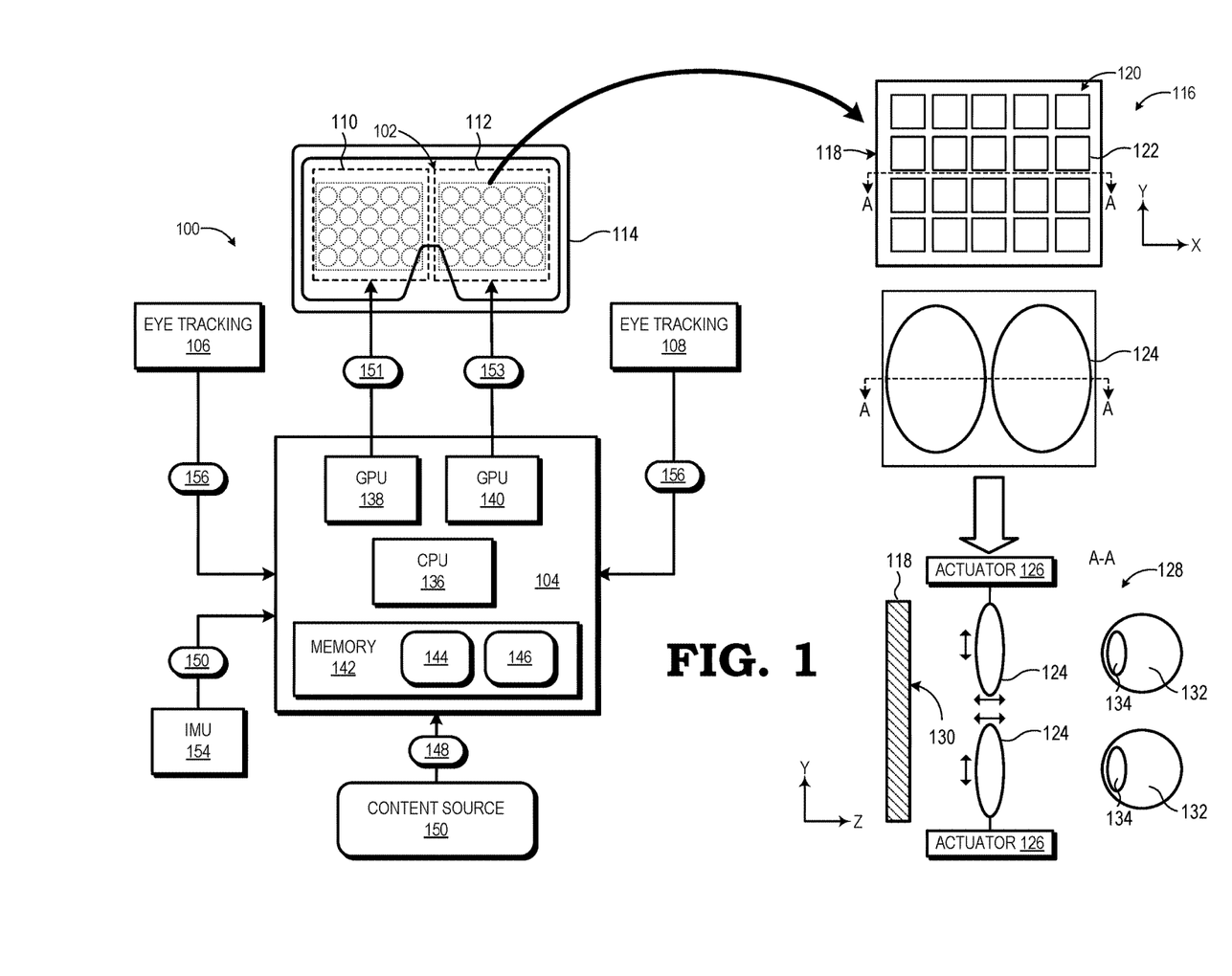
FIG. 1 is a diagram illustrating a near-eye display system employing eye tracking and corresponding lens actuation to provide varifocal aberration compensation in accordance with some embodiments.

FIG. 1 illustrates a near-eye display system 100 incorporating dynamic adjustments to compensate for vergence-accommodation disparities and gaze-dependent aberrations in accordance with at least one embodiment. In the depicted example, the near-eye display system 100 includes a computational display sub-system 102, a rendering component 104, and one or more eye tracking components, such as one or both of an eye tracking component 106 for tracking a user's left eye and an eye tracking component 108 for tracking the user's right eye. The computational display sub-system 102 includes a left-eye display 110 and a right-eye display 112 mounted in an apparatus 114 (e.g., goggles, glasses, etc.) that places the displays 110, 112 in front of the left and right eyes, respectively, of the user.

As shown by view 116, each of the displays 110, 112 includes at least one display panel 118 to display a sequence or succession of near-eye lightfield frames (hereinafter, "lightfield frame" for ease of reference), each of which comprises an array 120 of elemental images 122. For ease of reference, an array 120 of elemental images 122 may also be referred to herein as a lightfield frame 120. In some embodiments, a separate display panel 118 is implemented for each of the displays 110, 112, whereas in other embodiments the left-eye display 110 and the right-eye display 112 share a single display panel 118, with the left half of the display panel 118 used for the left-eye display 110 and the right half of the display panel 118 used for the right-eye display 112.

Each of the displays 110, 112 further includes one or more optical elements 124, such as lenses, disposed to be overlaying the display panel 118. Cross-view 128 of FIG. 1 depicts a cross-section view along line A-A of the optical elements 124 overlying the display panel 118 such that the optical elements 124 overlies the display surface 130 of the display panel 118 so as to be disposed between the display surface 130 and the corresponding eyes 132 of the user. In some embodiments, such as illustrated in FIG. 1, the optical elements 124 include magnifying lenses disposed over each of the left-eye display 110 and the right-eye display 112. In this configuration, each optical element 124 focuses a corresponding region of the display surface 130 onto the pupil 134 of the eye.

Although depicted in this example as having a single magnifying lens disposed over the displays 110, 112, the optical elements 124 can also include a plurality of lenses. For example, in some embodiments, the optical elements 124 include (in addition to or in place of the magnifying lenses) an array of lenslets (not shown) overlying the display surface 130 of the display panel 118 so as to be disposed between the display surface 130 and each corresponding eye 132 of the user. In such configurations, each lenslet of the lenslet array focuses a corresponding region of the display surface 130 onto the pupil 134 of the eye, with each such region at least partially overlapping with one or more adjacent regions. Thus, in such computational display configurations, when an array 120 of elemental images 122 is displayed at the display surface 130 of the display panel 118 and then viewed by the eye 132 through the lenslet array, the user perceives the array 120 of elemental images 122 as a single image of a scene. Thus, when this process is performed in parallel for both the left eye and right eye of the user with the proper parallax implemented therebetween, the result is the presentation of autostereoscopic three-dimensional (3D) imagery to the user with the relatively wide FOV and shallow form factor often provided by such computational displays.

Each of the optical elements 124 (e.g., magnifying lenses) is coupled to an actuator 126 configured to move the optical elements 124 along the X-axis, Y-axis, and Z-axis directions relative to the eyes 132 of the user and the display surface 130 of the display panel 118. In various embodiments, the actuator 126 is controlled by the rendering component 104 to change the physical distance between the display panel 118 and the eyes 132 of the user. For example, the actuator 126 may include optomechanical actuators such as piezoelectric, voice-coil, or electro-active polymer actuators. Although described here in the context of optomechanical actuators, those skilled in the art will recognize that any mechanical actuator capable of physically moving the optical elements 124 relative to the display panel 118 and the eyes 132 of the user may be used without departing from the scope of this disclosure.

As also shown in FIG. 1, the rendering component 104 includes a set of one or more processors, such as the illustrated central processing unit (CPU) 136 and graphics processing units (GPUs) 138, 140 and one or more storage components, such as system memory 142, to store software programs or other executable instructions that are accessed and executed by the processors 136, 138, 140 so as to manipulate the one or more of the processors 136, 138, 140 to perform various tasks as described herein. Such software programs include, for example, rendering program 144 comprising executable instructions for a lightfield frame rendering process, as described below, as well as an eye tracking program 146 comprising executable instructions for an eye tracking process, as also described below.

In operation, the rendering component 104 receives rendering information 148 from a local or remote content source 150, where the rendering information 148 represents graphics data, video data, or other data representative of an object or scene that is the subject of imagery to be rendered and displayed at the display sub-system 102. Executing the rendering program 144, the CPU 136 uses the rendering information 148 to send drawing instructions to the GPUs 138, 140, which in turn utilize the drawing instructions to render, in parallel, a series of lightfield frames 151 for display at the left-eye display 110 and a series of lightfield frames 153 for display at the right-eye display 112 using any of a variety of well-known VR/AR computational/lightfield rendering processes. As part of this rendering process, the CPU 136 may receive pose information 150 from an inertial management unit (IMU) 154, whereby the pose information 150 is representative of a pose of the display sub-system 102 and control the rendering of one or more pairs of lightfield frames 151, 153 to reflect the viewpoint of the object or scene from the pose.

As described in detail below, the rendering component 104 further may use eye pose information from one or both of the eye tracking components 106, 108 to shift the position of the magnifier lenses 124, and thereby changing the perception of the lightfield frame by the user's eyes 132. To this end, the eye tracking components 106, 108 each may include one or more infrared (IR) light sources (referred to herein as "IR illuminators) to illuminate the corresponding eye with IR light, one or more imaging cameras to capture the IR light reflected off of the corresponding eye as a corresponding eye image (eye image information 156), one or more mirrors, waveguides, beam splitters, and the like, to direct the reflected IR light to the imaging cameras, and one or more processors to execute the eye tracking program 146 so as to determine a current position, current orientation, or both (singularly or collectively referred to herein as "pose") of the corresponding eye from the captured eye image. Any of a variety of well-known eye tracking apparatuses and techniques may be employed as the eye tracking components 146, 148 to track one or both eyes of the user.

In at least one embodiment, the near-eye display system 100 may determine the eye pose as a past eye pose, a current eye pose, or a predicted (future) eye pose, or a combination thereof. In particular, a prediction of a future eye pose may provide improved performance or response time, and any of a variety of eye-movement prediction algorithms may be implemented to predict a future eye pose. Moreover, in some instances, the eye-tracking components 106, 108 may utilize scene information (e.g., location of faces within the imagery to be rendered or saliency heuristics) as input in prediction of a future gaze of the user's eyes for eye pose calculation. As such, the term "eye pose", as used herein, may refer to a previous, current, or predicted eye pose, or some combination thereof.

In a conventional computational display-based near-eye system, a vergence-accommodation conflict is sometimes encountered in which there is a mismatch between the vergence distance to focus on a virtual object and the accommodation distance due to, for example, the near-eye proximity of the display panel. Additionally, the conventional computational display-based near-eye system sometimes encounters gaze-dependent aberrations. As a result, the user's perception of the displayed imagery often is impacted, resulting in distorted views of the displayed imagery and discomfort/fatigue for the user.

As described herein, in at least one embodiment the near-eye display system 100 mitigates the impact of vergence-accommodation conflicts by shifting the magnifier lenses 124 relative to the user's eye to cause a corresponding change in the accommodation distance (e.g., shift in the accommodation plane in VR). This is accomplished by using the eye tracking components 106, 108 to track one or both eyes of the user so as to determine the pose of one or both of the eyes for a corresponding lightfield frame to be displayed. With the pose determined, the actuators 126 then shifts the positions of the magnifier lenses 124 relative to the eyes 132. This shift in the position of the magnifier lenses 124 relative to the eyes 132 has the effect of shifting the accommodation plane at which objects appear in focus. The rendering component 104 then re-renders the elemental images 122 within the lightfield frame with a match between the shifted accommodation plane and the vergence plane containing the object focused on by the user's gaze as determined by the pose of one or both of the eyes 132. In addition to shifting the accommodation plane, the rendering component 104 may scale the dimensions of the displayed imagery on display panel 118 so as to attempt to maintain a consistent size of the represented imagery in the virtual plane irrespective of Z-axis position of the magnifying lenses 124. In this manner, the position of the accommodation plane may be dynamically adjusted to accommodate the pose of the user's eye and better simulate real-life viewing responses for both vergence and accommodation. Further, in at least one embodiment the near-eye display system 100 mitigates the impact of gaze-dependent aberrations by shifting the magnifier lenses 124 relative to the user's eye 132. This compensates for aberrations caused by, for example, visual distortions due to gazing at different portions of the display screen, irreproducibility in placing a VR/AR HIVID at the same position on the user's face over repeated usages, differences in eye geometry (e.g., inter-pupillary distance) amongst different users, and the like.

Figure 2:
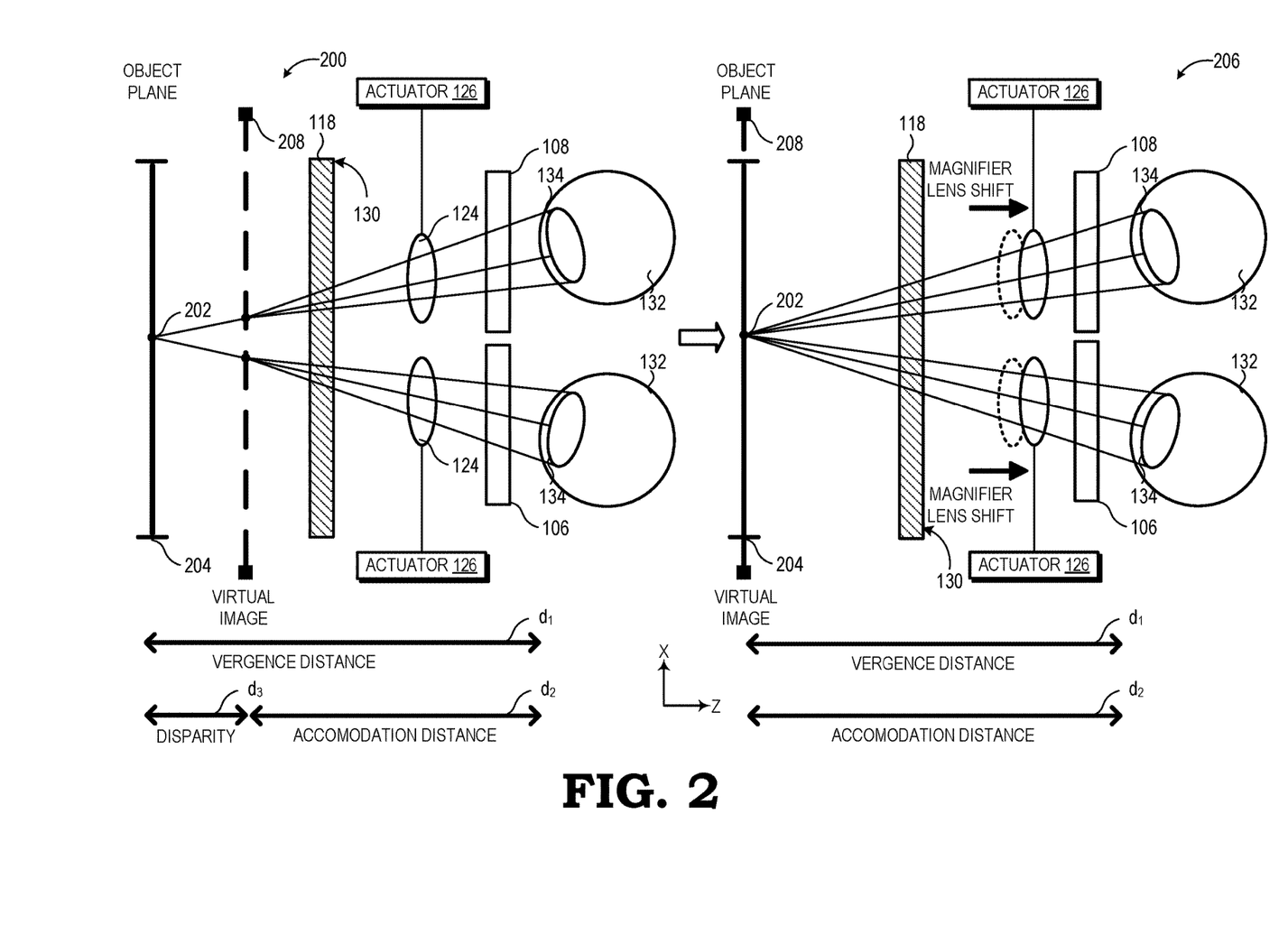
FIG. 2 is a diagram illustrating an example of dynamic vergence-accommodation conflict correction in the near-eye display system of FIG. 1 in accordance with some embodiments.

FIG. 2 illustrates a cross-section view of a computational display such as the ones utilized in the near-eye display system 100 using opto-mechanical actuators for dynamic correction of vergence-accommodation conflicts in accordance with some embodiments. As shown in the diagram 200 of the cross-section view, the eyes 132 of the user are directed towards a point 202 in the stereoscopic object plane 204 positioned at virtual depth $d_1$. As previously discussed relative to FIG. 1, each of the magnifier lenses 124 focuses a corresponding region of the display surface 130 onto the pupil 134 of the eye 132. Further, the magnifier lenses 124 are each coupled to an actuator 126 configured to move the magnifier lenses 124 along the X-axis, Y-axis, and Z-axis directions relative to the eyes 132 of the user and the display panel 118. The computational display also includes one or more eye tracking components, such as one or both of an eye tracking component 106 for tracking the user's left eye and an eye tracking component 108 for tracking the user's right eye.

The virtual image is rendered for display such that an object at point 202 in the virtual image (and/or other objects at the same virtual image plane 208 as point 202) appears to be in focus when the eyes 132 of the user accommodates and changes optical power to have a focal distance approximating that of the illustrated accommodation distance $d_2$. Points corresponding to that focal plane (i.e., virtual image plane 208) within the virtual image appear to be in-focus while points corresponding to other virtual image planes become blurred. Those skilled in the art will recognize that the focal plane may also be referred to as the "accommodation plane," as is used interchangeably herein.

In real-life viewing (as opposed to viewing a virtual scene), vergence and accommodation are consistent with one another: looking at a nearer object requires convergence and an increase in lens focal power, while looking at a farther object requires divergence and a decrease in focal power. Because the distances to which the eyes converge and accommodate are generally the same, the two responses are coupled such that changes in vergence produce changes in accommodation, and vice versa. Additionally, retinal blur varies consistently with changes in scene depth in real-life viewing, in which the perceived retinal image (at retinas of the eyes 132) is sharpest for objects at the distance to which the eye is focused and blurred for nearer and farther objects. As the eyes 132 look around a real-life scene, neural commands are sent to the lens muscles of the eyes 132 to change focal power and thereby minimize blur for the fixated part of the scene to provide depth cues. The correlation between blur and depth in real-life scenes aids depth perception.

With computational displays, as the eyes 132 look around a simulated virtual scene, the focal distance of the light originating from display panel 118 generally does not vary. Accordingly, focus cues (e.g., accommodation and blur in the retinal image) specify the depth of the display rather than the depths of objects in the simulated virtual scene. However, vergence stimulus varies depending on where the user looks in the simulated virtual scene. Eye vergence varies to fixate on different objects at different virtual depth in the simulated virtual scene. Accordingly, computational displays can encounter vergence-accommodation conflicts when the vergence distance $d_1$ (e.g., virtual depth of object from stereoscopic view, such as point 202) differs from the accommodation distance $d_2$.

For example, as illustrated in FIG. 2, a disparity $d_3$ exists between the vergence distance $d_1$ and the accommodation distance $d_2$ due to the virtual depth of the point 202 being positioned further away than the accommodation plane 208 at which the eyes 132 perceive objects as being in focus. Similarly, a disparity can arise when the virtual depth of another point (not shown) is positioned closer than the accommodation plane 208 at which the eyes 132 perceive objects as being in focus. A difference in those distances requires the user to uncouple vergence and accommodation, in which the accommodation distance relative to variable depths of virtual objects results in a binocular disparity. The uncoupling of vergence and accommodation often reduces viewer ability to fuse binocular stimulus, resulting in discomfort and fatigue for the user.

The disparity between the vergence plane and the accommodation planes of the eyes can be decreased using varifocal mechanisms to dynamically correct for vergence-accommodation conflicts. As shown in the diagram 206 of the cross-section view, the position of one or both of the magnifier lenses 124 may be adjusted by the actuators 126 to shift the accommodation plane 208 closer to the stereoscopic object plane 204 (i.e., vergergence plane) to decrease or eliminate the disparity $d_3$. The eye tracking components 106, 108 track the position of the pupils 134 of the eye 132 so as to determine the pose of one or both of the eyes 132 (e.g., the direction of gaze of the eye).

As described herein, the dynamic magnifier lens translation and accommodation plane adjustment process utilizes an eye tracking component (e.g., eye tracking components 106, 108) to determine the pose of a corresponding eye. This eye tracking component typically includes one or more IR illuminators to illuminate the eye, an imaging camera to capture imagery of IR reflections from the eye, one or more lenses, waveguides, or other optical elements to guide the reflected IR light from the eye to the imaging camera, and one or more processors executing a software program to analyze the captured imagery. Although the eye tracking components 106, 108 are illustrated as being overlaying the display panel 118 such as to be disposed between the magnifier lenses and the eyes 132 of the user (and therefore provide a benefit of providing a less oblique or more direct viewpoint of the pupil and cornea of the eye, and thus facilitating improved eye tracking accuracy), those skilled in the art will recognize that any positioning of the eye tracking components 106, 108 within the near-eye display system 100 of FIG. 1 may be utilized without departing from the scope of this disclosure.

In the example of FIG. 2, the eye tracking components 106, 108 determine that the eyes 132 of the user are directed towards a point 202 in the stereoscopic object plane 204 positioned at virtual depth $d_1$. To correct for the disparity $d_3$ between the vergence plane 204 (i.e., stereoscopic object plane) and the accommodation plane 208 (i.e., virtual image plane), a magnifier lens shift may be computed (e.g., by rendering component 104 of FIG. 1) to shift the position of at least one of the magnifier lenses 124 relative to the eyes 132 and the display panel 118.

As illustrated in the diagram 206 of the cross-section view, the actuators 126 have translated the magnifier lenses 124 along the Z-axis direction to be positioned closer to the eyes 132 and further away from the display panel 118. This shifts the accommodation plane 208 further away from the eyes 132 (i.e., increases the accommodation distance $d_2$). In contrast, actuating the actuators 126 to translate the magnifier lenses 124 along the Z-axis direction to be positioned further from the eyes 132 and closer to the display panel 118 shifts the accommodation plane 208 closer to the eyes 132 (i.e., decreases the accommodation distance $d_2$). As illustrated in the diagram 206 of the cross-section view, shifting of the accommodation plane 208 further away from the eyes 132 to match the distance of the vergence plane 204 allows the pupils 134 of the eyes 132 to rotate away from each other (i.e., divergence) and fixate on the point 202 to simulate real-life viewing responses for both vergence and accommodation.

Accordingly, the disparity between vergence distance $d_1$ and the accommodation distance $d_2$ can be reduced by matching the vergence plane 204 and accommodation plane 208. Although described here in the context of a simultaneous shift of both magnifier lenses, those skilled in the art will recognize that each of the magnifier lenses 124 may be independently actuated relative to each other and provide independent light paths for the two eyes 132.

Figure 3:
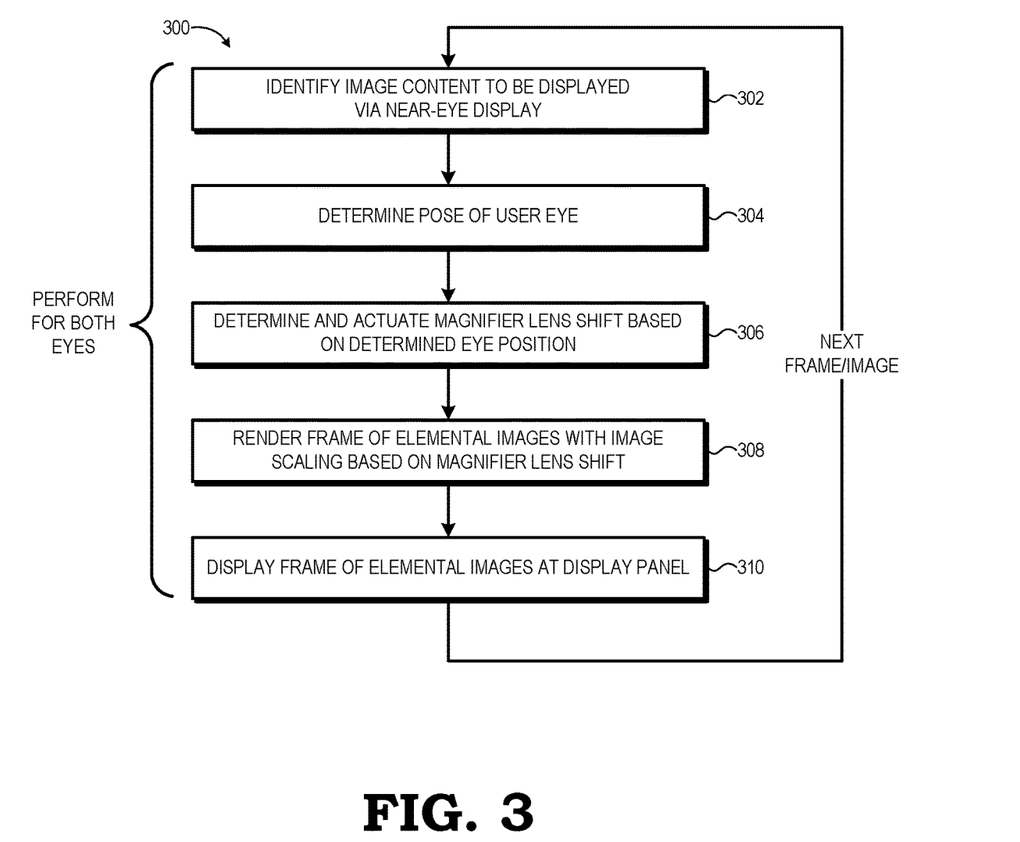
FIG. 3 is a flow diagram illustrating a method for dynamic vergence-accommodation conflict correction in the near-eye display system of FIG. 1 in accordance with some embodiments.

FIG. 3 is a method 300 of operation of the near-eye display system 100 for rendering lightfield frames with adjusted magnifier lens positioning to provide dynamic vergence-accommodation disparity correction in accordance with some embodiments. To facilitate understanding, method 300 is described below with frequent reference to example scenarios illustrated by FIGS. 1-2. The method 300 illustrates one iteration of the process for rendering and displaying a lightfield frame for one of the left-eye display 110 or right-eye display 112, and thus the illustrated process is repeatedly performed in parallel for each of the displays 110, 112 to generate and display a different stream or sequence of lightfield frames for each eye at different points in time, and thus provide a 3D, autostereoscopic VR or AR experience to the user.

For a lightfield frame to be generated and displayed, method 300 starts at block 302, whereby the rendering component 104 identifies the image content to be displayed to the corresponding eye of the user as a lightfield frame. In at least one embodiment, the rendering component 104 receives the IMU information 152 representing data from various pose-related sensors, such as a gyroscope, accelerometer, magnetometer, Global Positioning System (GPS) sensor, and the like, and from the IMU information 150 determines a pose of the apparatus 114 (e.g., HMD) used to mount the displays 110, 112 near the user's eyes. From this pose, the CPU 136, executing the rendering program 144, can determine a corresponding current viewpoint of the subject scene or object, and from this viewpoint and graphical and spatial descriptions of the scene or object provided as rendering information 148, determine the imagery to be rendered for the pose.

At block 304, the CPU 136, executing eye tracking program 146, determines the pose of the corresponding eye of the user. As explained herein, the pose of an eye may be determined using any of a variety of eye tracking techniques. Generally, such techniques include the capture of one or more images of IR light reflected from the pupil and cornea of the eye. The eye tracking program 146 then may manipulate the CPU 136 or the GPUs 138, 140 to analyze the images to determine the pose of the eye based on the corresponding position of one or both of the pupil reflection or corneal reflection. For example, in some embodiments, monocular eye tracking is performed to obtain region of interest information and calculate where an eye of the user is attempting to accommodate in a rendered scene (e.g., which object(s) in a scene is the gaze of the eye directed towards). By performing monocular eye tracking for each eye, a relative angular displacement between the two eyes is measured to determine vergence. Accordingly, accommodation is calculated based on the determined vergence (e.g., differential eye tracking). In other embodiments, binocular eye tracking is performed to determine accommodation independent of rendered scene content and/or orientation of the pupil relative to the cornea in turn may be used to determine the orientation of the eye (that is, the direction of gaze of the eye). It should be noted that although block 304 is illustrated in FIG. 3 as being subsequent to block 302, the process of block 304 may be performed before, during, or after the process of block 302.

With the pose of the user's eye determined, at block 306 the rendering program 144 manipulates the CPU 136 to determine and actuate a magnifier lens shift based on the pose of the user's eye. In some embodiments, determining the magnifier lens shift includes determining a shift vector representing desired translation of the magnifier lens in three-dimensional (3D) space. As explained above, the magnifier lens shift represents a shift in position to be applied to the magnifier lenses so as to change the accommodation plane distance to the eye. In particular, the magnifier lens shift is intended to match the vergence plane and accommodation plane for the eye based on the pose of the user's eye. That is, the magnifier lens shift is to serve to dynamically reduce disparities between vergence distance and accommodation distance for the eye.

In at least one embodiment, the determination of the magnifier lens shift is based on the calculation of a shift vector to be applied for changing the distance between the magnifier lens relative to the user's eye and the display panel. To illustrate, referring to an example scenario illustrated by cross-section view of FIG. 2, a pose for the user's eye 132 relative to the display panel 118 is determined to identify a point 202 in the virtual image at which the user's gaze is directed. With this example, a disparity $d_3$ between the vergence distance $d_1$ and the accommodation distance $d_2$ is identified. Accordingly, a shift vector is calculated and communicated to the actuator 126 to translate the magnifier lens 124 along the Z-axis direction to match distances from the eye 132 to the vergence plane 204 and accommodation plane 208 within the virtual image. Actuation of the magnifier lenses 124 to be positioned further from the eyes 132 (e.g., closer to the display panel 118) shifts the accommodation plane 208 closer to the eyes 132, and vice versa.

Referring back to FIG. 3, with the magnifier lens shift determined, and scaling of the elemental images determined, as appropriate, at block 308 the rendering program 144 manipulates the CPU 136 to instruct the corresponding one of the GPUs 138, 140 to render a lightfield frame with array 120 using the image content identified at block 302, whereby the lightfield frame includes an array of elemental images. In some embodiments, as part of this process, the CPU 136 calculates a relative magnification change based on the determined magnifier lens shift of block 306. In particular, there is a magnification dependence on eye-accommodation state and changing the eye accommodation distance may require a scaling of the displayed image to maintain the same view of the image content of block 302. For example, in the context of FIG. 2, the increased accommodation distance of the diagram 206 requires a magnification of an image rendered on the display panel 118 to maintain the same view of the virtual image as experienced by the eyes in the diagram 200 of FIG. 2. Accordingly, the CPU 136 provides the magnifier lens shift information and indication of any scaling to be applied to the dimensions of the elemental images to the GPU and instructs the GPU to render the lightfield frame such that the elemental images are rendered with matching vergence and accommodation planes, and scaled in accordance with the supplied scaling information, if any. The GPU subsequently renders the lightfield frame at block 310 and provides the lightfield frame to the corresponding one of the computational displays 110, 112 for display to the eye 132 of the user with the adjustment to the accommodation plane and/or relative magnification change of blocks 306 and 308.

Figure 4:
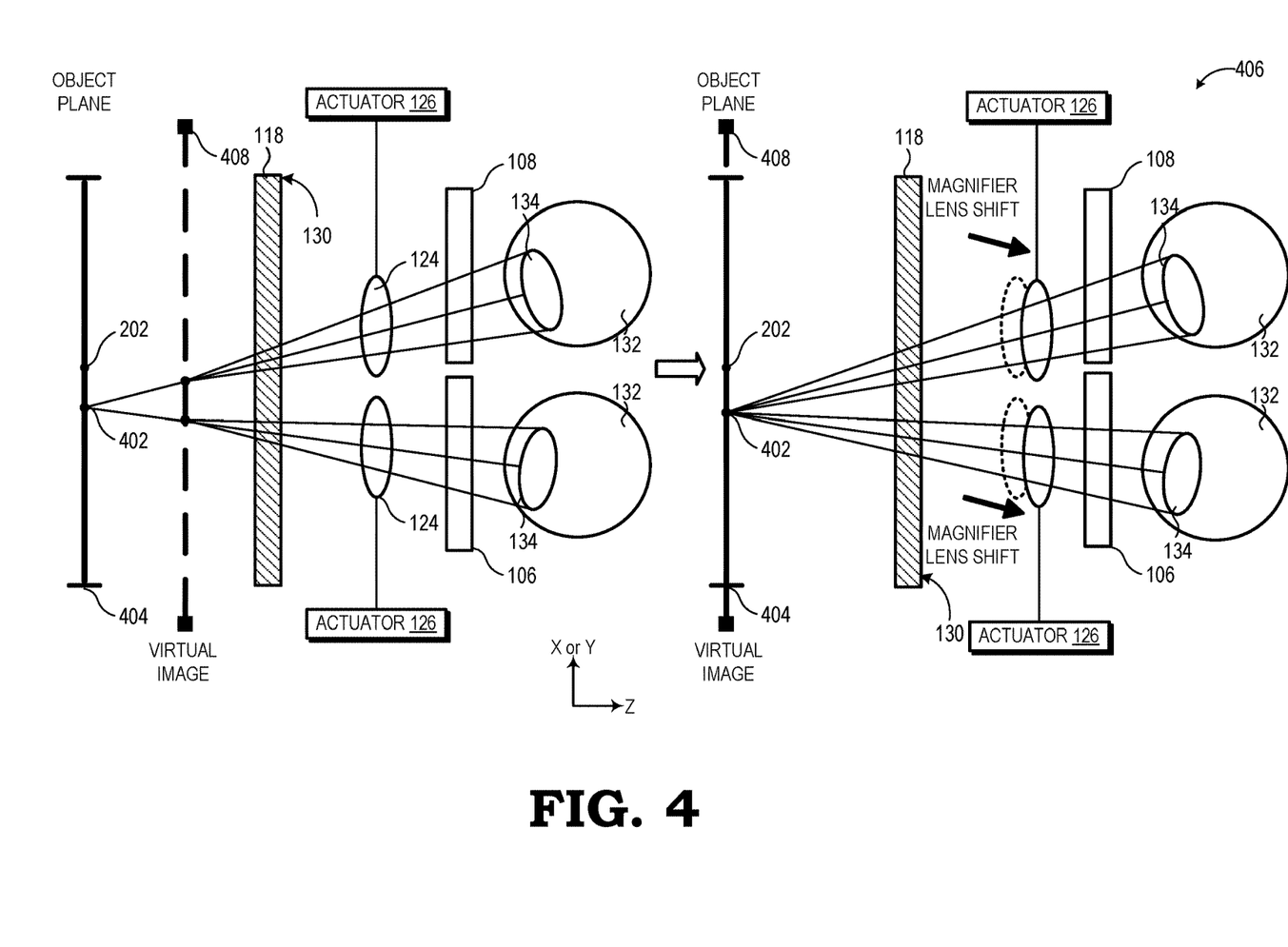
FIG. 4 is a diagram illustrating an example of dynamic gaze-dependent aberration correction in the near-eye display system of FIG. 1 in accordance with some embodiments.

The display of AR/VR imagery is sometimes associated with gaze-dependent aberrations, such as pupil swim when the eye's perception of displayed imagery distorts as the eye moves. Typically, distortion (as motion, etc.) is experienced as the eyes rotate off its center axis, and especially towards the edge of the lens in VR, as the distortion field at the edge is different than the distortion field at the center. FIG. 4 illustrates a cross-section view of a computational display such as the ones utilized in the near-eye display system 100 using opto-mechanical actuators for dynamic correction of gaze-dependent aberrations in accordance with some embodiments. Similar to the example embodiments discussed above relative to FIGS. 2-3, the eyes 132 of the user are directed towards a point 402 in the stereoscopic object plane 404 positioned at virtual depth $d_1$. Each of the magnifier lenses 124 focuses a corresponding region of the display surface 130 onto the pupil 134 of the eye 132. Further, the magnifier lenses 124 are each coupled to an actuator 126 configured to move the magnifier lenses 124 along the X-axis, Y-axis, and Z-axis directions relative to the eyes 132 of the user and the display panel 118. The computational display also includes one or more eye tracking components, such as one or both of an eye tracking component 106 for tracking the user's left eye and an eye tracking component 108 for tracking the user's right eye.

The virtual image is rendered for display such that an object at point 402 in the virtual image (and/or other objects at the same virtual image plane 408 as point 402) appears to be in focus when the eyes 132 of the user accommodates and changes optical power to have a focal distance approximating that of the illustrated accommodation distance $d_2$. Points corresponding to that focal plane (i.e., virtual image plane 408) within the virtual image appear to be in focus while points corresponding to other virtual image planes become blurred. Those skilled in the art will recognize that the focal plane may also be referred to as the "accommodation plane," as is used interchangeably herein.

As illustrated in FIG. 4, a disparity exists between the vergence distance and the accommodation distance due to the virtual depth of the point 402 being positioned further away than the accommodation plane 408 at which the eyes 132 perceive objects as being in focus. Similarly, a disparity can arise when the virtual depth of another point (not shown) is positioned closer than the accommodation plane 408 at which the eyes 132 perceive objects as being in focus. The disparity between the vergence plane and the accommodation planes of the eyes can be decreased using varifocal mechanisms to dynamically correct for vergence-accommodation conflicts, such as described in more detail above. As shown in the diagram 406 of the cross-section view, the position of one or both of the magnifier lenses 124 may be adjusted by the actuators 126 to shift the accommodation plane 408 closer to the stereoscopic object plane 404 (i.e., vergence plane) based on the pose of one or both of the eyes 132 (e.g., the direction of gaze of the eye) using the eye tracking components 106, 108 track the position of the pupils 134 of the eye 132.

As described herein, the dynamic magnifier lens translation, accommodation plane adjustment, and gaze-dependent aberration correction processes utilizes an eye tracking component (e.g., eye tracking components 106, 108) to determine the pose of a corresponding eye. This eye tracking component typically includes one or more IR illuminators to illuminate the eye, an imaging camera to capture imagery of IR reflections from the eye, one or more lenses, waveguides, or other optical elements to guide the reflected IR light from the eye to the imaging camera, and one or more processors executing a software program to analyze the captured imagery. Although the eye tracking components 106, 108 are illustrated as being overlaying the display panel 118 such as to be disposed between the magnifier lenses and the eyes 132 of the user, those skilled in the art will recognize that any positioning of the eye tracking components 106, 108 within the near-eye display system 100 of FIG. 1 may be utilized without departing from the scope of this disclosure.

The computational display of FIG. 4 shifts the magnifier lenses 124 to account for gaze-dependent aberrations, such as pupil swim, or variations in eye geometry amongst different users. As illustrated in the diagram 406 of the cross-section view, the actuators 126 have translated the magnifier lenses 124 along the Z-axis direction to be positioned closer to the eyes 132 and further away from the display panel 118. This shifts the accommodation plane 408 further away from the eyes 132 to match the distance of the vergence plane 404, thus simulating real-life viewing responses for both vergence and accommodation. Further, the actuators 126 have translated the magnifier lenses 124 along at least one of the X- and Y-axis directions to correct for gaze-dependent aberrations. For example, as illustrated in the diagram 406 of the cross-section view, the actuators 126 have further translated the magnifier lenses 124 (in addition to the Z-axis translation) along X-axis (and/or Y-axis) direction to correct for gaze-dependent aberrations, such as changes in the distortion field due to the off-center axis position of point 402 (relative to the center of display eye focus on point 202 of FIG. 2). Further, the actuators 126 may translate the magnifier lenses 124 to account for differential eye geometry amongst various users (e.g., inter-pupillary distance, etc.). Further, in some embodiments, the actuators 126 may translate the magnifier lenses 124 to account for differential geometry between the positioning of the near-eye display system 100 on the user's head relative to the eyes 132 across different viewing sessions and/or positioning of the near-eye display system 100 on the heads of various users. Accordingly, gaze-dependent aberrations may be dynamically corrected for based on the pose of a user's eye(s) relative to the display screen. Although described here in the context of a simultaneous shift of both magnifier lenses, those skilled in the art will recognize that each of the magnifier lenses 124 may be independently actuated relative to each other and provide independent light paths for the two eyes 132. Further, although described here in the context of a shift of the magnifier lenses to correct for both vergence-accommodation disparities and gaze-dependent aberrations, those skilled in the art will recognize that the gaze-dependent aberration correction may be applied (e.g., X- and/or Y-axis shifts as described herein) independently of the vergence-accommodation conflict correction (e.g., Z-axis shift as described herein).

Figure 5:
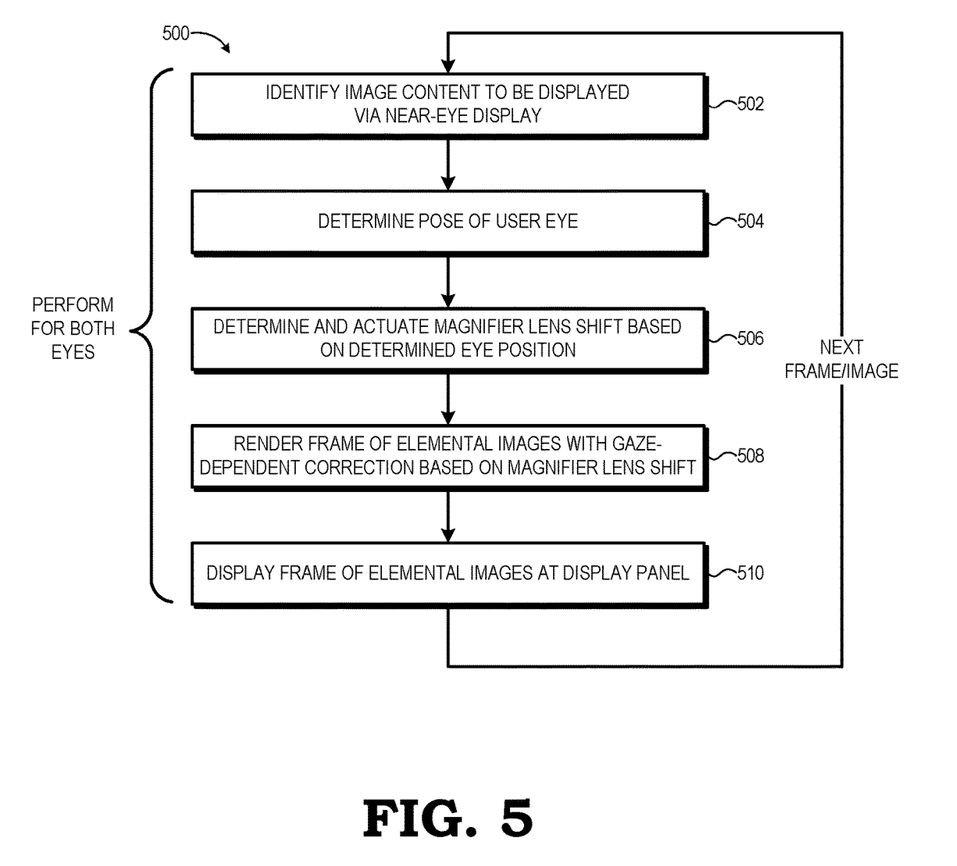
FIG. 5 is a flow diagram illustrating a method for dynamic gaze-dependent aberration correction in the near-eye display system of FIG. 1 in accordance with some embodiments.

FIG. 5 is a method 500 of operation of the near-eye display system 100 for rendering lightfield frames with adjusted magnifier lens positioning to provide dynamic gaze-dependent aberration correction in accordance with some embodiments. To facilitate understanding, method 500 is described below with frequent reference to example scenarios illustrated by FIGS. 1-4. The method 500 illustrates one iteration of the process for rendering and displaying a lightfield frame for one of the left-eye display 110 or right-eye display 112, and thus the illustrated process is repeatedly performed in parallel for each of the displays 110, 112 to generate and display a different stream or sequence of lightfield frames for each eye at different points in time, and thus provide a 3D, autostereoscopic VR or AR experience to the user.

For a lightfield frame to be generated and displayed, method 500 starts at block 502, whereby the rendering component 104 identifies the image content to be displayed to the corresponding eye of the user as a lightfield frame. In at least one embodiment, the rendering component 104 receives the IMU information 152 representing data from various pose-related sensors, such as a gyroscope, accelerometer, magnetometer, Global Positioning System (GPS) sensor, and the like, and from the IMU information 150 determines a pose of the apparatus 114 (e.g., HMD) used to mount the displays 110, 112 near the user's eyes. From this pose, the CPU 136, executing the rendering program 144, can determine a corresponding current viewpoint of the subject scene or object, and from this viewpoint and graphical and spatial descriptions of the scene or object provided as rendering information 148, determine the imagery to be rendered for the pose.

At block 504, the CPU 136, executing eye tracking program 146, determines the pose of the corresponding eye of the user. As explained herein, the pose of an eye may be determined using any of a variety of eye tracking techniques. Generally, such techniques include the capture of one or more images of IR light reflected from the pupil and cornea of the eye. The eye tracking program 146 then may manipulate the CPU 136 or the GPUs 138, 140 to analyze the images to determine the pose of the eye based on the corresponding position of one or both of the pupil reflection or corneal reflection. For example, in some embodiments, monocular eye tracking is performed to obtain region of interest information and calculate where an eye of the user is attempting to accommodate in a rendered scene (e.g., which object(s) in a scene is the gaze of the eye directed towards). By performing monocular eye tracking for each eye, a relative angular displacement between the two eyes is measured to determine vergence. Accordingly, accommodation is calculated based on the determined vergence (e.g., differential eye tracking). In other embodiments, binocular eye tracking is performed to determine accommodation independent of rendered scene content and/or orientation of the pupil relative to the cornea in turn may be used to determine the orientation of the eye (that is, the direction of gaze of the eye). It should be noted that although block 504 is illustrated in FIG. 5 as being subsequent to block 502, the process of block 504 may be performed before, during, or after the process of block 502.

With the pose of the user's eye determined, at block 506 the rendering program 144 manipulates the CPU 136 to determine and actuate a magnifier lens shift based on the pose of the user's eye. In some embodiments, determining the magnifier lens shift includes determining a shift vector representing desired translation of the magnifier lens in three-dimensional (3D) space. As explained above, the magnifier lens shift represents a shift in position to be applied to the magnifier lenses so as to dynamically correct for gaze-dependent aberrations and/or correct for differential positioning of a user's eye(s) relative to the display screen.

In at least one embodiment, the determination of the magnifier lens shift is based on the calculation of a shift vector to be applied for shifting the magnifier lenses as the user's eye moves around to look at different portions of a virtual image. To illustrate, referring to the example scenario illustrated by cross-section view of FIG. 4, a pose for the user's eye 132 relative to the display panel 118 is determined to identify a point 402 in the virtual image at which the user's gaze is directed. The actuators 126 have translated the magnifier lenses 124 along at least one of the X- and Y-axis directions to correct for gaze-dependent aberrations, such as changes in the distortion field due to the off-center axis position of point 402 (relative to the center of display eye focus on point 202 of FIG. 2).

In other embodiments, the determination of the magnifier lens shift is based on the calculation of a shift vector to be applied for shifting the magnifier lenses to account for differential eye geometry amongst various users (e.g., inter-pupillary distance, etc.). For example, the actuators 126 may translate the magnifier lenses 124 to be positioned closer (or further) away from each other to account for one user having a narrower (or wider) IPD from another user. Similarly, in other embodiments, the actuators 126 may translate the magnifier lenses 124 to account for differential geometry between the positioning of the near-eye display system 100 on the user's head relative to the eyes 132 across different viewing sessions and/or positioning of the near-eye display system 100 on the heads of various users. For example, it is often difficult for each individual user to reproducibly position the near-eye display system 100 at the same position on his/her face across multiple viewing sessions (e.g., taking HMD on and off).

In other embodiments, the determination of the magnifier lens shift may further include calculating the shift vector to change the distance between the magnifier lens relative to the user's eye and the display panel. For example, as illustrated in the diagram 406 of the cross-section view, the actuators 126 have also translated the magnifier lenses 124 along the Z-axis direction for vergence-accommodation conflict correction in addition to the X- and/or Y-axis translation for gaze-dependent aberration correction.

Accordingly, at block 506, a shift vector is calculated and communicated to the actuator 126 to translate the magnifier lens 124 along at least one of the X-, Y-, and Z-axis directions to perform gaze-dependent aberration correction. With the magnifier lens shift determined, and scaling of the elemental images determined, as appropriate, at block 508 the rendering program 144 manipulates the CPU 136 to instruct the corresponding one of the GPUs 138, 140 to render a lightfield frame with array 120 using the image content identified at block 502, whereby the lightfield frame includes an array of elemental images.

In some embodiments, as part of this process, the CPU 136 calculates a relative magnification change based on the determined magnifier lens shift of block 506. In particular, there is a magnification dependence on eye-accommodation state and changing the eye accommodation distance may require a scaling of the displayed image to maintain the same view of the image content of block 502 if the accommodation plane has been changed. For example, in the context of FIG. 2, the increased accommodation distance of the diagram 206 requires a magnification of an image rendered on the display panel 118 to maintain the same view of the virtual image as experienced by the eyes in the diagram 200 of FIG. 2.

The CPU 136 provides the magnifier lens shift information and indication of any scaling to be applied to the dimensions of the elemental images to the GPU and instructs the GPU to render the lightfield frame such that the elemental images are rendered to account for gaze-dependent aberrations. Further, in some embodiments, the GPU is instructed to render the lightfield frame such that the elemental images are rendered to for matching vergence and accommodation planes, and scaled in accordance with the supplied scaling information, if any. The GPU subsequently renders the lightfield frame at block 510 and provides the lightfield frame to the corresponding one of the computational displays 110, 112 for display to the eye 132 of the user.

The eye tracking and optical component configurations illustrated by FIGS. 1-5 have the benefit of providing dynamic correction for vergence-accommodation disparities and gaze-dependent aberrations while retaining a large field-of-view, high spatial-resolution, and a high frame-rate. That is, the embodiments described herein allow for vergence-accommodation disparity and/or gaze-dependent aberration correction without sacrificing the focusing power of the utilized optical components, which may otherwise lead to a corresponding reduction in the FOV and/or display frame-rate of the near-eye display system. For example, the embodiments described herein do not require any temporal multiplexing of signals generated by the near-eye display system, reduce the native display frame-rate of display panel, or place any intervening optics that reduce light throughput from the display panel to the user's eyes.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. In a near-eye display system, a method comprising:
   determining, using an eye tracking component of the near-eye display system, a pose of a user's eye;
   determining a shift vector for a magnifier lens of the near-eye display system based on the pose of the user's eye;
   communicating the shift vector to an actuator of the near-eye display system to instruct translation of the magnifier lens relative to the user's eye;
   rendering an array of elemental images at a position within a near-eye lightfield frame; and
   communicating the near-eye lightfield frame for display at a display panel of the near-eye display system.

2. The method of claim 1, wherein determining the shift vector comprises:
   determining a vergence distance and an accommodation distance to a target object focused on by the pose of the user's eye; and
   determining the shift vector to represent a shift in position of the magnifier lens in three-dimensional (3D) space to reduce a disparity between the vergence distance and the accommodation distance.

3. The method of claim 2, wherein determining the shift vector further comprises:
   determining the shift vector as representing the shift in position of the magnifier lens in 3D space to eliminate the disparity between the vergence distance and the accommodation distance.

4. The method of claim 1, wherein determining the shift vector comprises:
   determining a vergence plane and an accommodation plane within the near-eye lightfield frame based on the pose of the user's eye; and
   determining the shift vector as representing a shift in position of the magnifier lens in 3D space to converge the accommodation plane towards the vergence plane within the near-eye lightfield frame.

5. The method of claim 1, wherein determining the pose of the user's eye comprises: capturing imagery of the user's eye using an imaging camera disposed between the display panel and the user's eye.

6. The method of claim 1, wherein determining the shift vector comprises:
   determining a viewing distortion to be perceived based on the pose of the user's eye; and
   determining the shift vector as representing a shift in position of the magnifier lens in three-dimensional (3D) space to correct the viewing distortion.

7. The method of claim 6, wherein determining the shift vector further comprises:
   identifying a gaze-dependent aberration resulting from changes in a distortion field when the pose of the user's eye is redirected relative to the display panel.

8. In a near-eye display system, a method comprising:
   determining a pose of a first eye relative to a display panel of the near-eye display system using an eye tracking component of the near-eye display system;
   rendering a first near-eye lightfield frame based on the pose of the first eye;
   detecting a change in position of the first eye along an axis perpendicular to the display panel;
   determining a viewing distortion to be perceived based on the change in position of the first eye;
   determining a shift vector for a magnifier lens of the near-eye display system based on the pose of the first eye, the shift vector representing a shift in position of the magnifier lens in three-dimensional space (3D) to correct the viewing distortion;
   actuating the magnifier lens based on the shift vector; and
   rendering and displaying a second near-eye lightfield frame based on the shift vector.

9. The method of claim 8, wherein determining the shift vector comprises:
   determining a vergence plane and an accommodation plane within the first near-eye lightfield frame based on the pose of the first eye; and
   determining the shift vector as representing a shift in position of the magnifier lens in 3D space to converge the accommodation plane towards the vergence plane within the second near-eye lightfield frame.

10. The method of claim 9, further comprising:
    determining a scaling factor based on the shift vector; and
    scaling a display size of the second near-eye lightfield frame on the display panel based on the scaling factor to maintain a same perceived view of the second near-eye lightfield frame relative to the first near-eye lightfield frame.

11. The method of claim 8, wherein determining the shift vector further comprises:
    identifying a gaze-dependent aberration resulting from changes in a distortion field due to the change in position of the first user's eye.

12. The method of claim 8, further comprising:
    determining a pose of a second eye relative to the display panel;
    determining a second shift vector for the magnifier lens based on the pose of the second eye;
    actuating the magnifier lens based on the second shift vector; and
    rendering and displaying a third near-eye lightfield frame on the display panel based on the second shift vector to maintain a same perceived view of the third near-eye lightfield frame by the second eye relative to the second near-eye lightfield frame by the first eye.

13. A near-eye display system comprising:
    a display panel to display a near-eye lightfield frame comprising an array of elemental images;
    an eye tracking component to track a pose of a user's eye;
    an actuator to shift a position of a magnifier lens based on the pose of the user's eye; and
    a rendering component to position the array of elemental images within the near-eye lightfield frame based on the pose of the user's eye and the shifted position of the magnifier lens, wherein the rendering component is to position the array of elemental images by determining a viewing distortion to be perceived based on the pose of the user's eye and rendering the near-eye lightfield frame based on the shifted position of the magnifier lens in 3D space to correct the viewing distortion.

14. The near-eye display system of claim 13, wherein the rendering component is to position the array of elemental images within the near-eye lightfield frame by:
    determining a vergence plane and an accommodation plane within the near-eye lightfield frame based on the pose of the user's eye; and
    rendering the near-eye lightfield frame based on the shifted position of the magnifier lens in 3D space to converge the accommodation plane towards the vergence plane within the near-eye lightfield frame.

15. The method of claim 13, wherein determining the rendering component is further to position the array of elemental images within the near-eye lightfield frame by:

identifying a gaze-dependent aberration resulting from changes in a distortion field when a gaze of the user's eye is redirected on the display panel.

16. A rendering system comprising:

at least one processor;

an input to receive data from an eye tracking component indicating a pose of a user's eye relative to a near-eye display panel, wherein the input is further to receive data indicating a shifted position of a magnifier lens; and a storage component to store a set of executable instructions, the set of executable instructions configured to manipulate the at least one processor to determine a vergence plane and an accommodation plane within the near-eye lightfield frame based on the pose of the user's eye, the set of executable instructions further configured to manipulate the at least one processor to render a near-eye lightfield frame comprising an array of elemental images having a position within the near-eye lightfield frame based on the pose of the user's eye and the shifted position of the magnifier lens to converge the accommodation plane towards the vergence plane within the near-eye lightfield frame.

17. The rendering system of claim 16, wherein the set of executable instructions are configured to manipulate the at least one processor to render the near-eye lightfield frame by:

determining a viewing distortion to be perceived based on the pose of the user's eye; and rendering the near-eye lightfield frame based on the shifted position of the magnifier lens to correct the viewing distortion.

18. In a near-eye display system, a method comprising:

determining, using an eye tracking component of the near-eye display system, a pose of a user's eye;

determining a vergence plane and an accommodation plane within a near-eye lightfield frame based on the pose of the user's eye;

determining a shift vector for a magnifier lens of the near-eye display system based on the pose of the user's eye, the shift vector representing a shift in position of the magnifier lens in three-dimensional (3D) space to converge the accommodation plane towards the vergence plane within the near-eye lightfield frame;

communicating the shift vector to an actuator of the near-eye display system to instruct translation of the magnifier lens relative to the user's eye;

rendering an array of elemental images at a position within the near-eye lightfield frame; and communicating the near-eye lightfield frame for display at a display panel of the near-eye display system.

* * * * *

UNITED STATES PATENT AND TRADEMARK OFFICE
CERTIFICATE OF CORRECTION

PATENT NO. : 10,241,329 B2
APPLICATION NO. : 15/648731
DATED : March 26, 2019
INVENTOR(S) : John D. Perreault and Patrick Llull It is certified that error appears in the above-identified patent and that said Letters Patent is hereby corrected as shown below:

In the Claims

At Column 16 Line 29, correct "first user's eye." to be --first eye.--

At Column 17 Line 1, correct "The method of" to be --The near-eye display system of--

At Column 17 Line 22, correct "within the near-eye" to be --within a near-eye--

Signed and Sealed this
Nineteenth Day of November, 2019

Andrei Iancu
*Director of the United States Patent and Trademark Office*